United States Patent Office 3,103,780
Patented Sept. 17, 1963

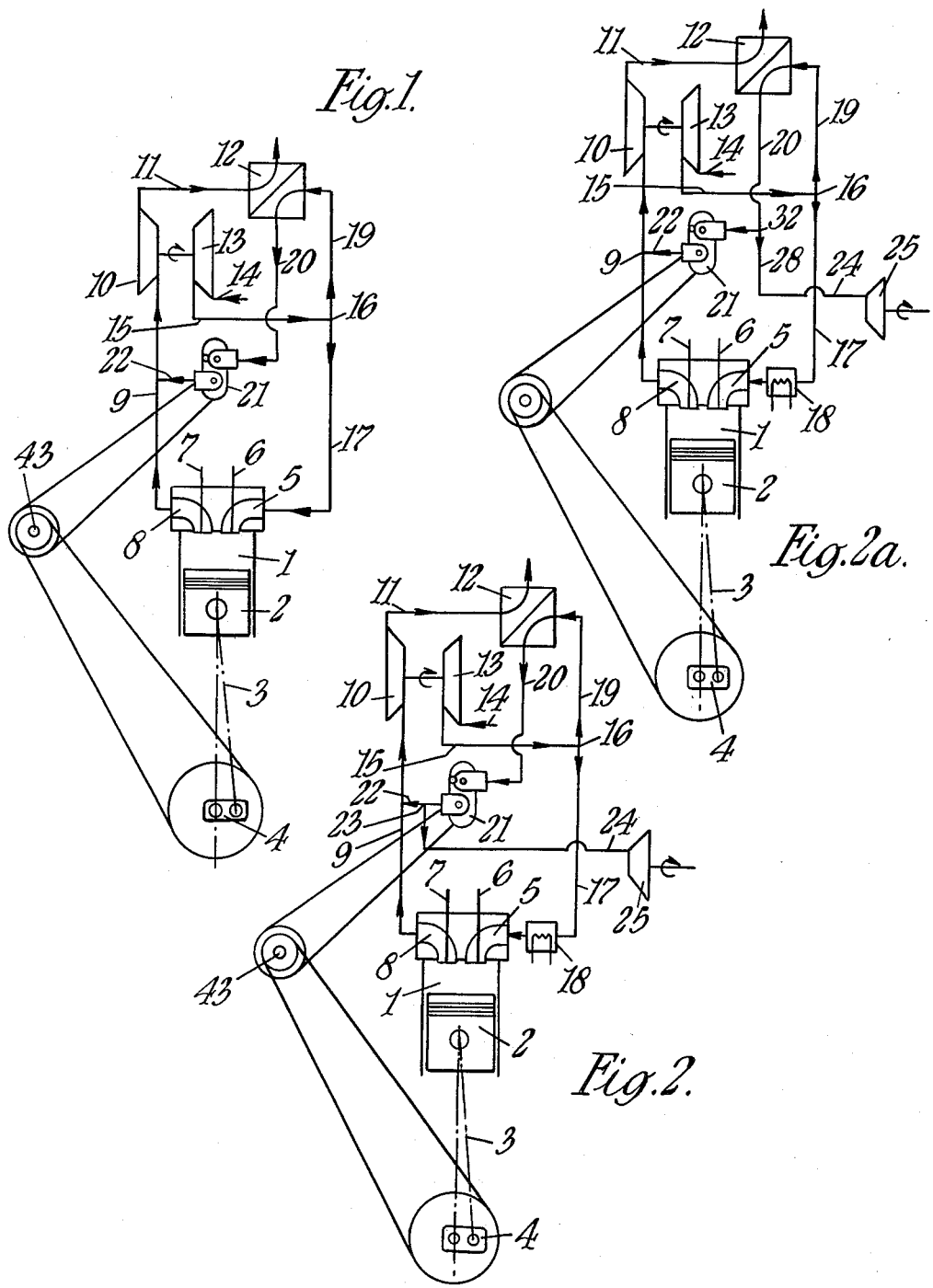

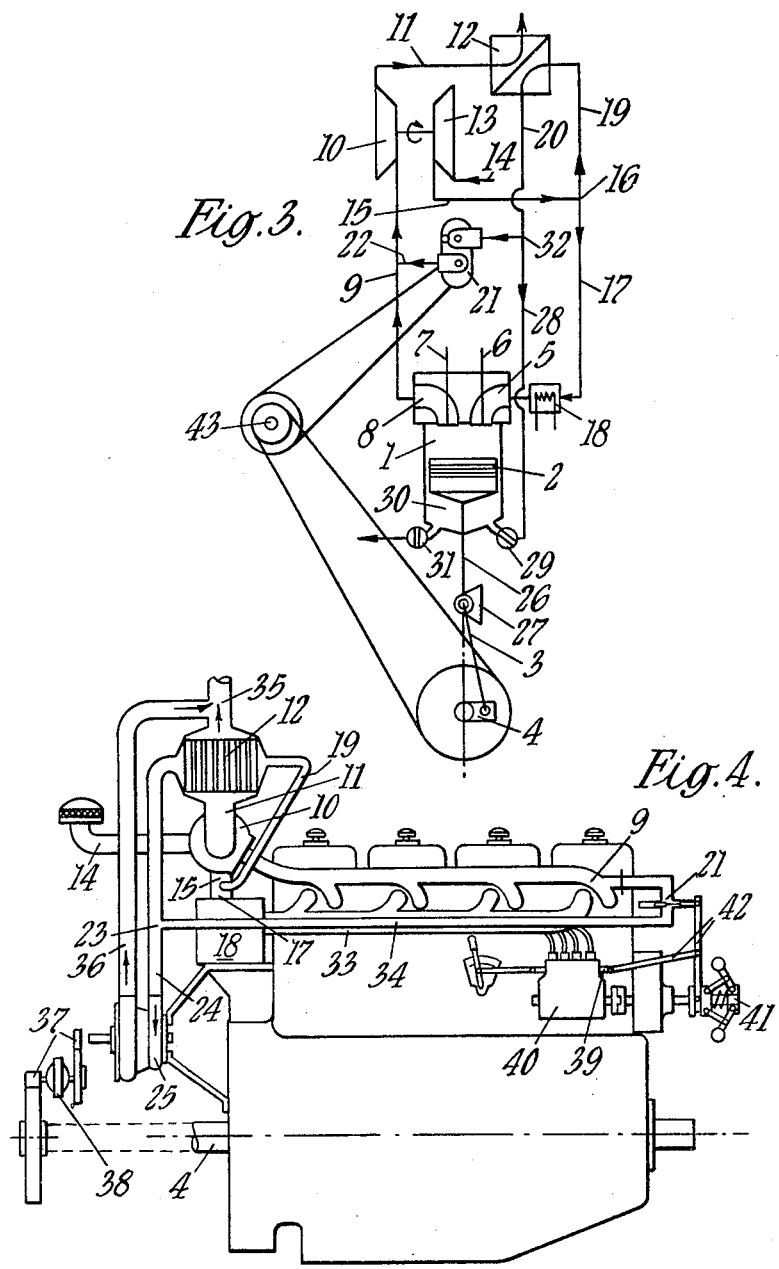

3,103,780
TURBOCHARGED INTERNAL COMBUSTION ENGINES
Donald Wilfred Tryhorn, Chalfont St. Peter, England, assignor to The British Internal Combustion Engine Research Association, Slough, England
Filed Aug. 4, 1961, Ser. No. 129,435
Claims priority, application Great Britain Aug. 11, 1960
8 Claims. (Cl. 60—13)

This invention relates to internal combustion engines which are pressure charged by a compressor driven by a turbine actuated by the exhaust gases of the engine, and particularly to the arrangement in which a heat exchanger is employed to extract further heat from the exhaust gases after they have passed through the turbine.

Turbine and compressor sets actuated in this way and operating at reasonably high pressure ratios are capable of providing more air than is necessary to maintain the operation of the engine at a constant high load, therefore there is surplus air under pressure in the charging system. There is also a considerable quantity of useable surplus heat in the exhaust gases after they have passed through the turbine, while the exhaust gases from the engine at high loads are at such a high temperature that they require to be cooled before being used in the turbine.

The object of this invention is to provide methods and means for improving the efficiency of the engine and turbo-compressor system, by employing some portion of these surpluses.

In many normal engines the cooling of the exhaust gases is accomplished by passing a large quantity of so-called scavenging air through the cylinder while both the inlet and exhaust orifices are open. The air supplying the cylinder swept volume returns energy to the engine whenever its pressure is higher than the exhaust pressure, but the scavenged air does not pick up enough heat for the work of its expansion through the turbine to compress the same quantity of air to the charging pressure and this constitutes a loss of energy from the system. In such engines a large quantity of scavenge air suffers an unnecessary throttling loss in passing through the cylinder, since only a small quantity of air is necessary to scavenge the clearance volume of the engine cylinder.

A method of bypassing air so that it does not pass through the engine cylinder is described in my co-pending British application No. 27,807 of even date. When this surplus air is passed through a metering device which is also an expanding machine, the power recovered will depend upon the volume of air handled and the pressure drop across the machine. For a given mass of air per cycle the volume of air required to be passed through the machine will increase with temperature and therefore this air which does not pass through the engine cylinder should not be passed through the engine air cooler if one is employed. The higher the temperature of this bypassed air, the greater will be the volume of it required to cool the engine exhaust gases to the temperature acceptable to the turbine at maximum load, and the greater will be the work recovered.

Thus, both the quantity and the energy content of the surplus air can be increased by the addition of heat and in accordance with the invention this surplus air is passed through a heat exchanger, which receives heat from the exhaust gases after they have passed through the turbine, and at least a part of this heated air is then passed into the turbine of the turbocharger.

The invention consists in an internal combustion engine having an inlet and an exhaust system, and which is pressure charged by a compressor driven by a turbine actuated by the exhaust gases of the engine characterised in having a heat exchanger which receives heat from the said exhaust gases after they have passed through the said turbine, and in which the air from the said compressor is divided into portions, one of which is passed to the inlet system of the engine in the normal manner, and the other is passed through the said heat exchanger and at least a part of this portion is then passed to the said turbine.

The invention further consists in an internal combustion engine as set forth in the preceding paragraph in which the portion of the air which is passed through the heat exchanger is again divided into portions, one of which is passed to the said turbine, and the other is passed to an expansion machine additional to the said turbine.

The invention still further consists in an internal combustion engine as set forth above in which a metering device is provided and at least a part of the air after having passed through said heat exchanger is passed through said metering device.

The invention still further consists in an internal combustion engine as set forth in the preceding paragraph in which the metering device is a compressing and expanding machine coupled to the engine so that it takes power from the engine when its outlet pressure is higher than its inlet pressure, and gives power to the engine when its inlet pressure is higher than its outlet pressure.

The accompanying drawings show diagrammatically, by way of example only, various embodiments of the invention in which:

FIGURE 1 shows a diagrammatic arrangement of one embodiment of the invention in which all the surplus air not required for charging the engine cylinders, after passing through the heat exchanger and the expanding device, is mixed with the exhaust gases and fed to the turbine driving the compressor for the charging air.

FIGURE 2 shows a diagrammatic arrangement of another embodiment of the invention, in which the surplus air not required for charging the engine cylinders, is divided and a first portion of the surplus air, after passing through the heat exchanger and the metering device is mixed with the exhaust gases and fed to a first turbine which drives the compressor for the charging air, while a second portion, after passing through the heat exchanger and the metering device, is fed to a second turbine or other expanding machine.

FIGURE 2a shows a diagrammatic arrangement similar to that of FIGURE 2 in which the surplus air not required for the engine is divided to provide air to the metering device and air to a second turbine or other expansion device.

FIGURE 3 shows a diagrammatic arrangement of a further embodiment of the invention in which the second portion of surplus air after passing through the heat exchanger and before reaching the metering device is fed to the space in the cylinders below the pistons of a cross head type internal combustion engine.

FIGURE 4 shows in side elevation an arrangement of a still further embodiment of the invention in which the air leaving the heat exchanger is sub-divided.

In FIGURE 1, 1 is a cylinder of an internal combustion engine, in which works a piston 2 coupled by a connecting rod 3 to a crankshaft 4. The cylinder 1 receives charging air through duct 5 controlled by inlet valve 6 and discharges exhaust gases through exhaust valve 7 into duct 8. The exhaust gases pass along duct 9 to turbine 10, and from this turbine pass along duct 11 to heat exchanger 12 and thence to atmosphere.

Charging air enters compressor 13 through duct 14 and passes along duct 15 to junction 16 where the flow is divided, and a first portion passes along duct 17 and thence to the engine cylinder 1 via duct 5, while a second portion passes along duct 19 to heat exchanger 12, then along duct 20 to a metering device 21, and from thence along duct 22 to join the exhaust gases flowing along duct 9 leading to turbine 10.

In FIGURE 2, like numbers indicate like parts, and in this embodiment the first portion of air passes along duct 17 to cooler 18 and thence to the engine cylinder 1, while the portion of the surplus air in duct 22 is divided at junction 23 and a portion passes to duct 9 as previously described, while another portion passes along duct 24 to a second expansion machine 25, other than the turbine 10. This second machine may be another turbine which may be coupled to the crankshaft 4 of the engine, or may drive any desired additional machine.

In FIGURE 2a, like numbers again indicating like parts, the air duct 20 is provided with a branch 28 that connects to duct 24 leading to the expansion chamber 25, instead of connecting the duct 24 to the duct 22.

FIGURE 3 shows an arrangement substantially the same as FIGURE 2, except that the portion of the surplus air in duct 20 is divided at junction 32 and a part passes to metering device 21 as previously described, while a second part passes from the junction 32, along duct 28, to valve 29, which controls the entry of the gases into the space 30 under the piston 2 of cylinder 1. The exit of the gases from this under piston space 30 is controlled by the valve 31. In this arrangement the piston 2 is coupled to a piston rod 26 which is guided by the crosshead 27 and is coupled to the connecting rod 3.

The volume of air per cycle at the compressor delivery pressure that is supplied to the under piston space 30 may be twice the volume of that space, and in this case the valve 29 will permit entry of air during substantially the whole of the two upward strokes of the piston 2 per cycle, the valve 31 will open at or near each T.D.C. of the piston and the air will expand to atmosphere.

In all cases where a lesser volume of air at the delivery pressure of the compressor is available, the valve 29 may close before the piston 2 has reached the top of its stroke, so that some expansion of this air will occur in the under piston space.

In many cases the characteristics of the turbocharger set do not match those of the engine. For example, the charging system may benefit by having pressure added to it by the engine at low outputs, but may be capable of giving more pressure than is necessary to maintain a constant high load on the engine. In the latter circumstances, a waste gate is sometimes provided to lead exhaust gases to the atmosphere without passing through the turbine, or an air bleed valve is provided to lead pressure air to the atmosphere without passing through the engine. Both these arrangements are very inefficient.

In accordance with the present invention the surplus air is made to provide more additional power than could be obtained by retaining the air in the charging system. The latter possibility would involve very high charging pressures and very high maximum cylinder pressures and thus necessitate a very strong and heavy engine.

The present invention incorporates a novel heat feed back system in which some of the exhaust heat is re-circulated to the turbine 10, while in addition otherwise waste heat is used in associated expansion machines. The employment of a heat exchanger and the arrangement whereby air heated therein is delivered to the exhaust duct, not only ensure that some exhaust heat is recirculated, but also that the mass flow through the turbine is increased. The former ensures a high efficiency of the thermodynamic cycle and the latter by increasing the turbine power enables the compressor, the power of which must be equal to that of the turbine, to increase the quantity of surplus air.

In the simplest arrangement the surplus air may be taken from the compressor delivery duct and passed to an expansion device such as an air motor, and the power output of the latter can be added to that of the engine. The additional power obtained in this way is relatively small and would be approximately equal to the increase in power that could be obtained by retaining the air in the charging circuit of a very strong engine.

A considerable increase in power can be obtained by employing the waste heat of the exhaust gases to heat this air in a heat exchanger, before it is passed to the expansion device or air motor.

A still greater increase in power can be obtained by passing some or all of the heated air to the exhaust duct and thereby increasing the mass flow through the turbine of the turbocharger, and thereby its power output. The flow of air to the exhaust duct requires to be controlled in order to proportion the volume passing thereto in relation to the volume passing to the engine. As the control means may be an expansion device, power can also be taken from it.

In an optimum arrangement, one portion of the surplus air heated in the heat exchanger is taken to the exhaust duct as described above, and another portion is delivered to an additional expanding machine. The portion of air in the additional machine is expanded from compressor delivery pressure to atmosphere, while the portion passing through the metering device which is also an expansion machine is expanded from the compressor delivery pressure to the exhaust pressure. Thus the power obtained from the metering device is limited by the limited expansion from the inlet pressure to the exhaust pressure, the value of the latter being influenced by other considerations.

In any engine system in which during normal operation the difference in pressure between inlet and exhaust is small, so that little power can be obtained from the metering device, the latter may be a throttle, which preferably should be adjustable in accordance with the load and speed of the engine.

When the metering device has a constant throughput and is coupled to the engine the volume of air bypassed is of course constant per engine cycle.

In the construction shown in FIGURE 4 air enters the compressor 13 of the turbocharger 10 through duct 14 and leaves through duct 15, where the flow is divided, and a first portion passes along duct 17 to cooler 18 and thence to the inlet manifold 33 and the cylinders of the engine, while a second portion passes along duct 19 to heat exchanger 12. Air leaves the heat exchanger through duct 20 and is again divided at junction 23, and a portion passes along duct 24 to an additional expansion machine 25 while the other portion passes along duct 34 to a metering device 21 and thence to the exhaust duct 9 where it joins the exhaust gases and is delivered to the turbine of the turbocharger 10. The gases leave this turbine through duct 11 and pass through the heat exchanger 12 to duct 35 and the atmosphere. Air leaves the additional expansion machine 25 through duct 36 and passes to the atmosphere. If desired this machine 25 may drive any desired additional machine, or it may be coupled to the crankshaft 4 of the engine through reduction gearing 37 and hydraulic coupling 38. The metering device 21 may be a compressing and expanding machine which can also return power to the engine, or it may be an adjustable throttle as shown. This throttle may be controlled by the combined action of the rack control rod 39 of the fuel injection pump 40 and the governor 41, through a suitable linkage 42. In this way the control is in accordance with the load and speed of the engine. The control gear described may also be used to actuate the control valve of a variable throughput compressing and expanding machine. When the metering device 21 is a compressing and expanding machine and it is required to incorporate a variable speed device in the drive to and from the crankshaft 4, this variable speed device may be incorporated in the shaft 43 of FIGURES 1, 2 and 3. If the metering device 21 is to be actuated independently of the engine, the independent driving and driven means may be coupled to shaft 43.

The device for metering the bypassed air may be any thermodynamic machine which is capable of expansion and compression, the most suitable being a positive displacement compressor or blower, for example of the lobe, Roots, or sliding vane type. Such a machine has an important feature in this application, in that the volume of air passing through it per cycle is determined by its capacity and speed of operation, and thus the volume of air being bypassed per cycle is not a function of the pressure difference between inlet and exhaust, which in turn is a function of the characteristics of the turbocharger and engine. Consequently, the metering of the bypassed air has a controlling effect upon the weight of air passing to the cylinder of the engine, and upon the output of the turbocharger.

In cases where it is advantageous to vary the volume of air that is being bypassed, other than by variations in the speed of the engine, this may be carried out by providing a drive for the machine which is independent of the engine or a variable speed drive between the engine and the positive displacement machine, or by providing a machine in which the throughput is variable independently of the speed of rotation of the machine. A machine of the latter type is described in British patent specification No. 665,484. Independent variation of the volume of air bypassed, gives an increased degree of control of the air pressure available to the engine, independently of the normal characteristics of a turbocharged engine.

Another advantage of the system is that when a cooler for the charging air is provided, it can be smaller than normal, since only a portion of the total air passes through it.

A further advantage of the system is that because the air required to cool the exhaust gases does not pass through the engine, the period during which the inlet and exhaust valves are open at the same time can be reduced, with consequent reduction in the depth of the recesses normally required in the piston crown to ensure that the latter does not hit the valve heads, near T.D.C.

It is to be understood that the above description is by way of example only and that details for carrying the invention into effect may be varied without departing from the scope of the invention claimed.

I claim:

1. An internal combustion engine, having inlet and exhaust systems, and which is pressure charged, a compressor, a turbine actuated by the exhaust gases of the engine drivingly connected to said compressor, a heat exchanger that receives heat from the said exhaust gases after they have passed through the said turbine, means to divide the air from the said compressor into portions, one of which portions is passed to the inlet system of the engine and the other portion is passed through said heat exchanger, and through a compressing and expanding metering device, means to divide said other portion into parts, means to pass one part to the turbine and to pass the other part to an expansion machine other than the said turbine.

2. In an internal combustion engine, having inlet and exhaust systems, and which is pressure charged by a compressor driven by a turbine located in the exhaust system actuated by the exhaust gases of the engine, a heat exchanger to receive heat from the said exhaust gases in said exhaust system after they have passed through the said turbine, means in said inlet system to divide the air from said compressor into portions, one of which is passed to the inlet of the engine, and the other portion is passed through said heat exchanger, duct means including means by which said other portion is again divided into parts, a compressing and expanding metering device, one part of said other portion being passed through said metering device to said turbine, and the remaining part is passed to an expansion machine other than said turbine.

3. An internal combustion engine as claimed in claim 2, in which the expansion machine other than the said turbine is an enclosed space at the outer end of at least one cylinder of the internal combustion engine, the volume thereof being increased and decreased by the motion of the underside of the piston, and in which entry of gases into and exit from the said space is valve controlled.

4. An internal combustion engine as claimed in claim 2, in which the expansion machine other than the said turbine is another turbine.

5. In an internal combustion engine, having inlet and exhaust systems, and which is pressure charged by a compressor driven by a turbine located in said exhaust system and actuated by the exhaust gases of the engine, a heat exchanger to receive heat from the said exhaust gases after they have passed through the said turbine, means in said inlet system to divide the air from the said compressor into portions, one of which portions passes to the inlet of the engine and the other portion passes through said heat exchanger, a compressing and expanding metering device coupled to the engine, at least part of said other portion of said air being passed to the said exhaust system leading to said turbine through said metering device so that it takes power from the engine when the pressure at its outlet is higher than at its inlet and gives power to the engine when the pressure at its inlet is higher than at its outlet.

6. In an internal combustion engine as claimed in claim 5, in which the compressing and expanding metering device is coupled to the engine by way of a variable speed device.

7. An internal combustion engine as claimed in claim 5, in which the compressing and expanding metering device is of the kind in which the throughput of air is variable independently of the speed of rotation of the device.

8. An improved method of producing power from an engine system including an internal combustion engine having inlet and exhaust systems and a turbine operated by the exhaust gases of the engine and driving compressor for the charging air, comprising the steps of dividing the charging air into portions, passing a first portion to the inlet system of the engine and passing a second portion to a heat exchanger receiving heat from the exhaust gases after the latter have passed through the turbine, and delivering a measured part of this second portion to the inlet side of said turbine to provide additional driving fluid to said turbine.

References Cited in the file of this patent

UNITED STATES PATENTS

| 2,385,366 | Lysholm | Sept. 25, 1945 |
| 2,400,068 | Birkigt | May 14, 1946 |